United States Patent
Kawaguchi et al.

(10) Patent No.: US 6,583,203 B2
(45) Date of Patent: Jun. 24, 2003

(54) BRANCHED POLYACETAL RESIN COMPOSITION

(75) Inventors: Kuniaki Kawaguchi, Fuji (JP); Hidetoshi Okawa, Fuji (JP); Yoshihisa Tajima, Fuji (JP)

(73) Assignee: Polyplastics Co., Ltd., Osaka (JP)

( * ) Notice: Subject to any disclaimer, the term of this patent is extended or adjusted under 35 U.S.C. 154(b) by 21 days.

(21) Appl. No.: 09/869,805

(22) PCT Filed: Dec. 1, 2000

(86) PCT No.: PCT/JP00/08541

§ 371 (c)(1), (2), (4) Date: Jul. 5, 2001

(87) PCT Pub. No.: WO01/40376

PCT Pub. Date: Jun. 7, 2001

(65) Prior Publication Data

US 2002/0193469 A1 Dec. 19, 2002

(30) Foreign Application Priority Data

Dec. 3, 1999 (JP) .............................. 11-344194

(51) Int. Cl.⁷ ............................ C08K 5/34; C08K 5/09; C08K 5/16

(52) U.S. Cl. .................... 524/99; 524/100; 524/102; 524/205; 524/291; 524/343; 524/359

(58) Field of Search .......................... 524/99, 100, 102, 524/205, 291, 343, 359

(56) References Cited

U.S. PATENT DOCUMENTS

| | | | |
|---|---|---|---|
| 4,446,263 A | 5/1984 | Bryant | |
| 5,859,098 A | 1/1999 | Takagaki et al. | |
| 5,973,081 A | * 10/1999 | Kanai et al. | 525/398 |

FOREIGN PATENT DOCUMENTS

| | | | |
|---|---|---|---|
| EP | 0 171 941 | 3/1990 | |
| EP | 0 412 783 A | 2/1991 | ............ C08G/2/18 |
| EP | 0 519 749 A2 | 12/1992 | ........... C08L/89/00 |
| EP | 0 655 482 | 6/1999 | |
| JP | 57-98545 | 6/1982 | |
| JP | 59-133245 | 7/1984 | |
| JP | 60-195155 | 10/1985 | |
| JP | 61-36339 | 2/1986 | |
| JP | 61-47744 | 3/1986 | |
| JP | 7-150006 | 6/1995 | |
| JP | 8-12734 | 1/1996 | |

OTHER PUBLICATIONS

Patent Abstract of Japan, vol. 015, No. 332 (C–10861); Aug. 23, 1991 *JP 03 126752 A (Tory Ind Inc), May 29, 1991.

* cited by examiner

Primary Examiner—Kriellion A. Sanders
(74) Attorney, Agent, or Firm—Nixon & Vanderhye P.C.

(57) ABSTRACT

To offer a resin material in which various properties such as excellent appearance and rigidity inherent to a polyacetal resin are maintained and a weather (light) resistance is improved. That is, a branched polyacetal resin composition comprising 100 parts by weight of a branched polyacetal copolymer (A) having an oxymethylene group as the main repeating unit and having a branching unit represented by the following formula (I), 0.01 to 5 parts by weight of a weather (light) resistant stabilizer (B) and 0.01 to 5 parts by weight of a hindered amine substance (C):

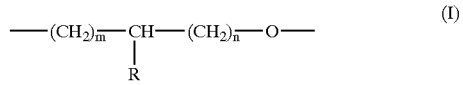

wherein m and n each is an integer of 0 to 5; the sum of m+n is 1 to 5; and R is a monovalent organic group having a molecular weight of 40 to 1000.

5 Claims, No Drawings

BRANCHED POLYACETAL RESIN COMPOSITION

TECHNICAL FIELD OF THE INVENTION

The present invention relates to a branched polyacetal resin composition excellent in weather (light) resistant stability. Particularly, it relates to a polyacetal resin composition excellent in weather (light) resistance, which prevents cracking, discoloration and deterioration in glossiness of a molded article upon light exposure for a long time, and maintains the initial surface conditions thereof.

PRIOR ART

A polyacetal resin has excellent properties in mechanical property, thermal property, electric property, slidability, moldability, etc. and has been widely used mostly as structural materials, functional parts, etc. in electric instruments, car parts, precision machine parts, etc. However, as the field where a polyacetal resin is utilized is expanded, there is a tendency that the properties requested are becoming more and more high, complex and special. Among such requests, there is a demand for further improvement in weather (light) resistance.

Interior and exterior parts in automobiles, etc. and parts of electric instruments, etc. sometimes give rise to inconveniences such as discoloration of the surface of the molded article, reduction in surface smoothness to diminish glossiness, and cracking generated on the surface of the parts to deteriorate the appearance, depending on the atmosphere used, such as upon exposure to sunrays and water (rain, moisture condensation, etc.) and a contact to the other atmosphere for a long time. Accordingly, if the polyacetal resin is used in the parts exposed to sunrays etc., it is necessary to use those compositions blended with various weather (light) resistant stabilizers, and addition of various weather (light) resistant stabilizers has been known. For example, JP-A 57-98545, JP-A 59-133245, JP-A 60-195155 and JP-A 61-36339 disclose a combination of a weather (light) resistant stabilizer and a hindered amine substance, JP-A 61-47744 discloses a combination of a weather (light) resistant stabilizer, a hindered amine substance and a fatty ester, and JP-A 7-150006 discloses a combination of a weather (light) resistant stabilizer, a hindered amine substance, an oxyalkylene polymer and acrylic resin.

However, these methods of adding stabilizers etc. do not necessarily give satisfactory results when the stabilizers, etc. are used in small amounts, and they should be added in large amounts in order to maintain long-term weather (light) resistance. In this case, the stabilizers, etc. will easily ooze from the surface of resin to cause the discoloration and deteriorated glossiness of the surface of a molded article, resulting in deterioration of the resin conditions. Therefore, there is a demand in the industrial world for further development of polyacetal resin materials excellent in weather (light) resistance, which prevent cracking, discoloration and deterioration in glossiness of a molded article upon light exposure for a long time, and maintain the initial surface conditions thereof.

DISCLOSURE OF THE INVENTION

An object of the present invention is to solve the above problems and to provide polyacetal resin materials excellent in weather (light) resistance, which prevent cracking, discoloration and deterioration in glossiness of a molded article upon light exposure for a long time, and maintain the initial surface conditions thereof.

For achieving the above object, the present inventors have carried out a detail investigation going deeply into the molecular skeleton and physical properties of the polyacetal resin. As a result, they have found a combination of modification of the polymer skeleton, which is effective for achieving the object, and the stabilizing components effectively incorporated to the polymer, whereupon the present invention has been achieved.

That is, the present invention relates to a branched polyacetal resin composition, in which 100 parts by weight of a branched polyacetal copolymer (A) having an oxymethylene group as the main repeating unit and having a branching unit represented by the following formula (I) is compounded with 0.01 to 5 parts by weight of a weather (light) resistant stabilizer (B) and 0.01 to 5 parts by weight of a hindered amine substance (C):

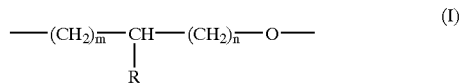

(I)

wherein m and n each is an integer of 0 to 5; the sum of m+n is 1 to 5; and R is a monovalent organic group having a molecular weight of 40 to 1000.

The composition comprises (A), (B) and (C).

DETAILED DESCRIPTION OF THE INVENTION

The present invention will be explained in detail. First, the branched polyacetal copolymer (A) used as the base resin in the present invention has an oxymethylene group (—$CH_2$—O—) as the main repeating unit and has a branching unit represented by the following formula (I). The presence of the branching unit is one of the important elements for achieving the object of the present invention.

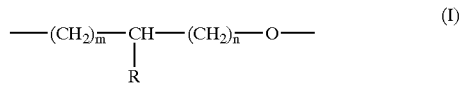

(I)

wherein m and n each is an integer of 0 to 5; the sum of m+n is 1 to 5; and R is a monovalent organic group having a molecular weight of 40 to 1000.

In the branching unit represented by the formula (I), the branching group R is a monovalent organic group having a molecular weight of 40 to 1000. If the molecular weight of R is less than 40, improvements-in weather (light) resistance cannot be expected, while if the molecular weight is more than 1000, there is the problem of a reduction in the degree of crystallization. Preferably, the molecular weight of R is 50 to 500. From the viewpoint of the improvements in weather (light) resistance and maintenance of other physical properties, the ratio of the branching unit represented by the formula (I) is preferably 0.001 to 10 parts by weight, more preferably 0.01 to 3 parts by weight, to 100 parts by weight of the oxymethylene unit (—$CH_2O$—).

Although there is no particular limitation for the process for producing the branched polyacetal copolymer (A) of the present invention, the copolymer (A) is preferably prepared by a copolymerization of 100 parts by weight of trioxane (a), 0.001 to 10 parts by weight of a monofunctional glycidyl compound (b), and 0 to 20 parts by weight of a cyclic ether compound (c) copolymerizable with trioxane. The branched polyacetal copolymer (A) comprising such monomers can be produced easily and the resulting copolymers have excellent properties. The trioxane (a) used herein is a cyclic trimer of formaldehyde, which is generally obtained by a reaction of an aqueous solution of formaldehyde in the presence of an acid catalyst, and is used after purifying by distillation, etc. It is preferred that the trioxane (a) used for the polymerization contains as little as possible of impurities such as water, methanol and formic acid.

The branched polyacetal copolymer (A), composed of oxymethylene units and units (I), may be produced by copolymerizing (a) trioxane, (b) the monofunctional glycidyl compound and (c) the optional cyclic ether compound. Any glycidyl compound may be used to meet the definition of "R" of the formula (I).

The monofunctional glycidyl compound (b) refers to organic compounds having one glycidyl group in the molecule. Typical examples thereof include glycidols, glycidyl ethers composed of aliphatic or aromatic alcohols or (poly) alkylene glycol adducts thereof and glycidols, and glycidyl esters composed of fatty or aromatic carboxylic acids or (poly)alkylene glycol adducts thereof and glycidols. The monofunctional glycidyl compound (b) is used as a branched structure component of the branched polyacetal copolymer (A) used in the present invention.

As the monofunctional glycidyl compound (b), a glycidyl ether compounds represented by the following formulae (II), (III) and (IV) are preferred:

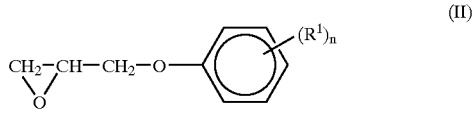
(II)

wherein $R^1$ is a $C_{1-12}$ alkyl group, a substituted alkyl group, an alkoxy group, an aryl group, a substituted aryl group or halogen; and n is an integer of 0 to 5 and, when n is 2 or more, the $R^1$s may be the same or different:

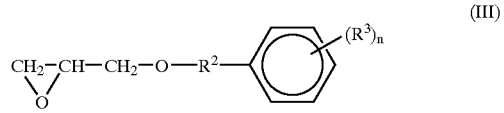
(III)

wherein $R^2$ is a $C_{1-30}$ alkylene group, a substituted alkylene group or a polyalkylene oxide glycol residue; $R^3$ is a $C_{1-12}$ alkyl group, a substituted alkyl group, an alkoxy group, an aryl group, a substituted aryl group or halogen; and n is an integer of 0 to 5 and, when n is 2 or more, the $R^3$s may be the same or different:

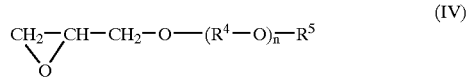
(IV)

wherein $R^4$ is a $C_{1-30}$ alkylene group; n is an integer of 0 to 20; and $R^5$ is a $C_{1-30}$ alkyl group, a $C_{2-20}$ alkenyl group or an alkynyl group.

Specific examples thereof include methyl glycidyl ether, ethyl glycidyl ether, butyl glycidyl ether, 2-ethyl hexyl glycidyl ether, 2-methyl octyl glycidyl ether, phenyl glycidyl ether, p-tert-butyl phenyl glycidyl ether, sec-butyl phenyl glycidyl ether, n-butyl phenyl glycidyl ether, phenyl phenol glycidyl ether, cresyl glycidyl ether, dibromocresyl glycidyl ether, and glycidyl ethers consisting of (poly) ethylene glycol adducts of aliphatic or aromatic alcohols and glycidols. Examples of the glycidyl ester compounds include glycidyl acetate and glycidyl stearate.

In the production of the branched polyacetal copolymer (A) of the present invention, the amount of the monofunctional glycidyl compound (b) to be copolymerized is 0.001 to 10 parts by weight, preferably 0.01 to 10 parts by weight, more preferably 0.1 to 5 parts by weight, to 100 parts by weight of trioxane as the component (a). If the amount of the component (b) in the copolymer is too small, the effect of improving physical properties such as strength and rigidity, as an object of the present invention, cannot be achieved, while if the amount is excessive, there is a fear that problems arise in the strength, rigidity etc. due to a lowering of crystallinity and in the moldability due to a lowering of fluidity.

As the monofunctional glycidyl compound (b), preferably used is one having a molecular weight of 100 to 1000. If the molecular weight of the monofunctional glycidyl compound (b) is too high, the branched chains of the resulting branched polyacetal copolymer (A) become longer, which may disturb the crystallinity of the resin, etc. to exert an undesired influence on the slidability as a basic property. On the other hand, if the molecular weight of the component (b) is too low, the effect of improving the weather (light) resistance, as the object of the present invention, is minimized.

The branched polyacetal copolymer (A) of the present invention is preferably copolymerized further with the cyclic ether/formal compound (c) copolymerizable with trioxane as the copolymerizing component other than the components described above. The cyclic ether/formal compound (c) is not particularly essential for maintaining and improving the rigidity and toughness as desired in the present invention, but this cyclic ether compound is used preferably as a copolymerizable monomer in order to stabilize the polymerization reaction for producing the branched polyacetal copolymer (A) and to improve the thermostability of the resulting branched polyacetal copolymer (A). Examples of the cyclic ether compound (c) copolymerizable with trioxane include ethylene oxide, propylene oxide, butylene oxide, epichlorohydrin, epibromohydrin, styrene oxide, oxetane, 3,3-bis(chloromethyl) oxetane, tetrahydrofuran, trioxepane, 1,3-dioxolane, ethylene glycol formal, propylene glycol formal, diethylene glycol formal, triethylene glycol formal, 1,4-butane diol formal, 1,5-pentane diol formal and 1,6-hexane diol formal. Among them, ethylene oxide, 1,3-dioxolane, diethylene glycol formal and 1,4-butane diol formal are preferable. In the branched polyacetal copolymer (A) used in the present invention, the amount of the cyclic ether/formal compound (c) to be copolymerized is 0 to 20 parts by weight, preferably 0.05 to 15 parts by weight, more preferably 0.1 to 10 parts by weight, to 100 parts by weight of trioxane as component (a). If the amount of the cyclic ether/formal compound (c) in the copolymer is too small, a copolymerization reaction becomes unstable and the resulting branched polyacetal copolymer is inferior in thermostability, while if the amount of the cyclic ether/formal compound (c) in the copolymer is excessive, the resulting copolymer is poor in mechanical physical properties such as rigidity and strength, an object of the present invention.

Basically, the branched polyacetal copolymer (A) of the present invention is obtained, for example, by a method of bulk polymerization of the trioxane (a), the monofunctional glycidyl compound (b) and the cyclic ether/formal compound (c) using a cationic polymerization catalyst, where if necessary, an appropriate amount of a molecular-weight regulator is added thereto.

Examples of the molecular-weight regulator include low-molecular acetal compounds having alkoxy groups such as methylal, methoxy methylal, dimethoxy methylal, trimethoxy methylal and oxymethylene di-n-butyl ether, alcohols such as methanol, ethanol and butanol, and ester compounds. Among these compounds, the low-molecular acetal compounds having alkoxy groups are particularly preferable. There is no limitation at all for the amount of such a molecular-weight regulator to be added so far as the effect of the present invention is not deteriorated.

Examples of the cationic polymerization catalyst include lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride, boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine, inorganic and organic acids such as perchloric acid, acetyl perchlorate, t-butyl perchlorate, hydroxyacetic acid, trichloroacetic acid, trifluoroacetic acid and p-toluene sulfonic acid, complex salt compounds such as triethyl oxonium tetrafluoroborate, triphenyl methyl hexafluoroantimonate, allyl diazonium hexafluorophosphate and allyl diazonium tetrafluoroborate, alkyl metal salts such as diethyl zinc, triethyl aluminum and diethyl aluminum chloride, heteropoly acid and isopoly acid. Among these compounds, boron trifluoride and boron trifluoride coordination compounds such as boron trifluoride-diethyl ethelate, boron trifluoride-dibutyl ethelate, boron trifluoride-dioxanate, boron trifluoride-acetic anhydrate and boron trifluoride-triethylamine complex are preferable. Such a catalyst may be diluted with an organic solvent or the like and then used.

There is no particular limitation for the polymerizer in the production of the polyacetal copolymer (A) used in the present invention but known apparatuses may be used and any of a batch system, a continuous method, etc. may be applicable. It is preferred to keep the polymerization temperature at 65 to 135° C. Deactiviation after the polymerization is carried out by adding a basic compound or an aqueous solution thereof to a reaction product discharged from the polymerizer after the polymerization reaction or to a reaction product in the polymerizer.

Examples of the basic compound for neutralizing and deactivating the polymerization catalyst include ammonia, amines such as triethyl amine, tributyl amine, triethanol amine and tributanol amine, hydroxide salts of alkali metal or alkaline earth metal, and other known deactivators of the catalyst. It is preferred that, after the polymerization, an aqueous solution thereof is added to the product without delay to conduct deactivation. After such a polymerization and a deactivation, washing, separation/recovery of unreacted monomers, drying, etc. may be carried out by conventional methods, if necessary.

The polymerization degree and the like of the polyacetal copolymer (A) thus obtained and used in the present invention are not particularly limited. The polymerization degree and the like can be controlled in accordance with the purpose of the product and molding means. When the polymer is to be molded, the melt index (MI) thereof, as determined at a temperature of 190° C. under a loading of 2.06 kg, is preferably from 1 to 100 g/10 min., more preferably from 2 to 90 g/10 min. Further, a small amount of a cross-linking agent such as a diglycidyl compound can be copolymerized in order to control the viscosity.

In the process for producing the polyacetal copolymer (A) and the composition of monomers described above, it is possible to use a cyclic formal compound capable of forming branched chains in place of the monofunctional glycidyl compound (b), and the obtained polyacetal copolymer (A) is as preferable as the above-described one. Examples of the cyclic formal compound capable of forming branched chains include 4-methyl-1,3-dioxolane, 4-ethyl-1,3-dioxolane, 4-isopropyl dioxolane and 4-phenyl-1,3-dioxolane.

The resin composition of the present invention is characterized by compounding the above-described branched polyacetal copolymer (A) with the weather (light) resistant stabilizer (B) and the hindered amine substance (C).

The weather (light) resistant stabilizer (B) used in the present invention is at least one member selected from the group consisting of a benzotriazole substance (1), a benzophenone substance (2), an oxalic acid anilide substance (3), an aromatic benzoate substance (4), and a cyanoacrylate substance (5).

Examples of these materials are as follows: The benzotriazole substance (1) includes 2-(2'-hydroxy-5'-methyl-phenyl)benzotriazole, 2-(2'-hydroxy-3',5'-di-t-butyl-phenyl) benzotriazole, 2-(3,5-di-t-amyl-2-hydroxy phenyl) benzotriazole, 2-(2'-hydroxy-3,5'-di-isoamyl-phenyl) benzotriazole, 2-[2-hydroxy-3,5-bis-(α,α-dimethyl benzyl) phenyl]benzotriazole, 2-(2'-hydroxy-4'-octoxyphenyl) benzotriazole, etc.; the benzophenone substance (2) includes 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, 2-hydroxy-4-oxybenzylbenzophenone, etc.; the oxalic acid anilide substance (3) includes N-(2-ethyl-phenyl)-N'-(2-ethoxy-5-t-butyl phenyl)oxalic diamide, N-(2-ethyl-phenyl)-N'-(2-ethoxy-phenyl)oxalic diamide, etc.; the aromatic benzoate substance (4) includes p-t-butyl phenyl salicylate, p-octyl phenyl salicylate, etc.; and the cyanoacrylate substance (5) includes 2-ethylhexyl-2-cyano-3,3-diphenyl acrylate, ethyl-2-cyano-3,3-diphenyl acrylate, etc.

Usually, the amount of the weather (light) resistant stabilizer (B) used is preferably 0.01 to 5 parts by weight, to 100 parts by weight of the branched polyacetal copolymer (A). The amount outside of this range is not preferable because given a smaller amount, sufficient weather (light) resistant stability cannot be achieved, while given a larger amount, pollution in molds, deterioration in mechanical properties, and economical disadvantage may be caused.

The hindered amine substance (C) used in the present invention is a piperidine derivative having sterically hindering group(s), and examples thereof include 4-acetoxy-2,2,6,6-tetramethyl piperidine, 4-stearoyloxy-2,2,6,6-tetramethyl piperidine, 4-acryloyloxy-2,2,6,6-tetramethyl piperidine, 4-methoxy-2,2,6,6-tetramethyl piperidine, 4-benzoyloxy-2,2,6,6-tetramethyl piperidine, 4-cyclohexyloxy-2,2,6,6-tetramethyl piperidine, 4-phenoxy-2,2,6,6-tetramethyl piperidine, 4-benzyloxy-2,2,6,6-tetramethyl piperidine, 4-(phenyl carbamoyloxy)-2,2,6,6-tetramethyl piperidine, bis(2,2,6,6-tetramethyl-4-piperidyl) oxalate, bis(2,2,6,6-tetramethyl-4-piperidyl)malonate, bis(2,2,6,6-tetramethyl-4-piperidyl)adipate, bis(2,2,6,6-tetramethyl-4-piperidyl)sebacate, bis(1,2,2,6,6-pentamethyl-4-piperidyl)sebacate, bis(2,2,6,6-tetramethyl-4-piperidyl)terephthalate, 1,2-bis(2,2,6,6-tetramethyl-4-piperidyloxy)ethane, bis(2,2,6,6-tetramethyl-4-piperidyl) hexamethylene-1,6-dicarbamate, bis(1-methyl-2,2,6,6- tetramethyl-4-piperidyl)adipate, and tris(2,2,6,6-tetramethyl1-4-piperidyl)benzene-1,3,5-tricarboxylate. Further, high-molecular-weight polycondensates of piperidine derivatives, such as polycondensates of dimethyl succinate-1-(2-hydroxyethyl)-4-hydroxy-2,2,6,6-tetramethyl piperidine, are also effective.

The amount of the hindered amine substance is preferably 0.01 to 5 parts by weight, to 100 parts by weight of the branched polyacetal copolymer (A). The amount outside of this range is not preferable because given a smaller amount, sufficient weather (light) resistance cannot be achieved, while given a larger amount, pollution in molds, deterioration in mechanical properties, and economical disadvantage may be caused.

Although the mechanism by which the resin composition of the present invention which comprises the branched polyacetal copolymer (A), the weather (light) resistant stabilizer (B) and the hindered amine substance (C) demonstrates excellent weather (light) resistance is not revealed but is possibly that the effect of molecular tangling upon melting caused by the specific branched structure introduced into the polyacetal copolymer, the disturbance and unevenness of the crystalline structure of the resin due to the specific branched structure, and the influence on amorphous portions of the specific branched structure control the dispersion in the resin and oozing on the resin of the weather (light) resistant stabilizer (B) and the hindered amine substance (C). These effects cannot be obtained until a combination of the branched polyacetal copolymer (A), the weather (light) resistant stabilizer (B) and the hindered amine substance (C) is selected.

The resin composition of the present invention may preferably be blended with various stabilizers selected as necessary. Examples of the stabilizers include at least one selected from hindered phenolic compounds, nitrogen-containing compounds, alkali or alkaline earth metal hydroxides, inorganic salts and carboxylates. Further, one or more common additives for thermoplastic resin, such as coloring agents e.g. dye, pigment etc., lubricants, releasing agents, antistatic agents, surfactants, organic polymer materials, and inorganic or organic fillers in a form of fiber, powder and plate may be added as necessary as far as the object and effect of the present invention are not hindered.

The composition of the present invention can be easily prepared in any methods generally used for preparing conventional resin compositions. For example, a method in which the respective components are mixed, and kneaded and extruded in an extruder to prepare pellets, and a predetermined amount of the pellets is mixed and formed into a molded article having a desired composition, or a method of directly introducing one or more of the respective components into a molding machine, and any of which can be used.

EXAMPLES

Now, the present invention will be described in detail by reference to the Examples, which are not intended to limit the present invention. Evaluation was conducted in the following manner.

[Weather (Light) Resistance Test 1]

A test was carried out by irradiating a specimen with ultraviolet rays under fading conditions at 83° C. in a xenon weather meter (XBL-SUN-HCH model, manufactured by Suga Shikenki Co., Ltd.). The crack generation time is the elapsed time until the initial cracking was recognized when presence or absence of cracking on the surface of the specimen was observed through a loupe of 10 magnifications. As this value is larger, it means excellent.

[Weather (Light) Resistance Test 2]

In an under-glass-exposure test (complete close system) in the southern part of Fuji City, Shizuoka, Japan, a test specimen was exposed to sunrays for a long time to evaluate the change of the surface conditions (discoloration, glossiness) In the evaluation of the change of the surface conditions, the change in the color tone and glossiness of the specimen before and after irradiation for 6 months was judged in 4 ranks (excellent, slightly excellent, slightly inferior, and inferior).

Examples 1 to 8

A continuous mixing reactor constituted from a jacket for passing a heating (or cooling) medium at outside, a barrel having a shape where circles of two cross sections are partially overlapped, and rotating shafts equipped with a paddle was used, and trioxane (a), the monofunctional glycidyl compound (b) and the cyclic ether compound (c) were added thereinto in a ratio shown in Table 1 while each of two rotating shafts having a paddle was rotated at 150 rpm. Then, methylal was continuously fed as the molecular-weight regulator, and as the catalyst, a solution of boron trifluoride-dibutyl ethelate in dibutyl ether was mixed therewith in an amount of 0.005% by weight on a basis of boron trifluoride to the trioxane, and the uniform mixture was bulk-polymerized. The reaction product discharged from the polymerizer was immediately passed through a grinder and added to an aqueous solution containing 0.05% by weight of triethylamine at 60° C. to deactivate the catalyst. After separation, washing and drying, a crude polyacetal copolymer was obtained.

Then, to 100 parts by weight of the crude polyacetal copolymer were added 4% by weight of a 5% by weight aqueous solution of triethylamine and 0.3% by weight of pentaerythrityl-tetrakis [3-(3,5-di-tert-butyl-4-hydroxyphenyl)propionate], followed by subjecting to melting and kneading at 210° C. in a twin extruder to remove unstable parts. The structure and copolymerizing composition of the resulting polyacetal copolymer were confirmed by means of a $^1$H-NMR measurement using hexafluoroisopropanol-$d_2$ as a solvent.

To 100 parts by weight of the branched polyacetal copolymer (A) by the above method, the weather (light) resistant stabilizer (B) and the hindered amine substance (C) were added shown in Table 1, and 0.03 part by weight of pentaerythrityl-tetrakis [3-(3,5-di-tert-butyl-4-hydroxyphenyl)propionate] and 0.15 part by weight of melamine were further added, followed by subjecting to melting and kneading at 210° C. using a twin extruder whereupon the branched polyacetal resin composition in a form of pellets was obtained. Then, the pellets were formed into plate specimens having a thickness of 2 mm and a 50 mm square by an injection molding machine and then evaluated for weather (light) resistance by the method described above. Results are shown in Table 1.

Comparative Examples 1 to 9

Compositions in the form of pellets were prepared by the same manner as in the Examples except that a polyacetal copolymer having no branched structure prepared without using the monofunctional glycidyl compound (b) was used as the base resin, or the branched polyacetal copolymer (A) was not blended with the weather (light) resistant stabilizer (B) or with the hindered amine substance (C), or the branched polyacetal resin (A) was blended with a smaller or larger amount of the weather (light) resistant stabilizer (B) or the hindered amine substance (C) Results are shown in Table 1.

TABLE 1

| | | Polyacetal copolymer (A); polymer composition | | | | | Resin composition | | | | Crack generation time (under fading conditions at 83° C.) (Hr) | Change in surface conditions (outdoor exposure for 6 months) | |
|---|---|---|---|---|---|---|---|---|---|---|---|---|---|
| | | Trioxane (a) parts by weight | Component (b) Type | Component (b) parts by weight | Component (c) Type | Component (c) parts by weight | parts by weight (A) | Component (B) Type | Component (B) parts by weight | Component (C) Type | Component (C) parts by weight | | Change in color tone | Change in glossiness |
| Example | 1 | 100 | b1 | 0.2 | c1 | 3.4 | 100 | B1 | 0.2 | C1 | 0.2 | 420 | excellent | excellent |
| | 2 | 100 | b1 | 0.01 | c1 | 3.4 | 100 | B1 | 0.2 | C1 | 0.2 | 350 | slightly excellent | slightly excellent |
| | 3 | 100 | b1 | 0.2 | c1 | 3.4 | 100 | B2 | 0.2 | C1 | 0.2 | 410 | excellent | excellent |
| | 4 | 100 | b1 | 0.2 | c1 | 3.4 | 100 | B1 | 0.2 | C2 | 0.2 | 415 | excellent | excellent |
| | 5 | 100 | b2 | 0.2 | c1 | 3.4 | 100 | B1 | 0.2 | C1 | 0.2 | 385 | excellent | excellent |
| | 6 | 100 | b3 | 0.2 | c1 | 3.4 | 100 | B1 | 0.2 | C1 | 0.2 | 395 | excellent | excellent |
| | 7 | 100 | b4 | 0.2 | c1 | 3.4 | 100 | B1 | 0.2 | C1 | 0.2 | 395 | excellent | excellent |
| | 8 | 100 | b1 | 0.2 | c2 | 2.0 | 100 | B1 | 0.2 | C1 | 0.2 | 405 | excellent | excellent |
| Com. Example | 1 | 100 | — | — | c1 | 3.4 | 100 | B1 | 0.2 | C1 | 0.2 | 270 | slightly inferior | inferior |
| | 2 | 100 | — | — | c1 | 3.4 | 100 | B2 | 0.2 | C1 | 0.2 | 255 | slightly inferior | inferior |
| | 3 | 100 | — | — | c2 | 2.0 | 100 | B1 | 0.2 | C1 | 0.2 | 240 | inferior | inferior |
| | 4 | 100 | b1 | 0.2 | c1 | 3.4 | 100 | B1 | 0.2 | — | — | 185 | inferior | inferior |
| | 5 | 100 | b1 | 0.2 | c1 | 3.4 | 100 | B1 | 0.2 | C1 | 0.001 | 210 | inferior | slightly inferior |
| | 6 | 100 | b1 | 0.2 | c1 | 3.4 | 100 | B1 | 0.2 | C1 | 7 | 280 | inferior | inferior |
| | 7 | 100 | b1 | 0.2 | c1 | 3.4 | 100 | — | — | C1 | 0.2 | 195 | inferior | inferior |
| | 8 | 100 | b1 | 0.2 | c1 | 3.4 | 100 | B1 | 0.001 | C1 | 0.2 | 200 | inferior | slightly inferior |
| | 9 | 100 | b1 | 0.2 | c1 | 3.4 | 100 | B1 | 7 | C1 | 0.2 | 275 | inferior | inferior |

Component (b)
b1: Butyl glycidyl ether
b2: 2-Ethyl hexyl glycidyl ether
b3: Phenyl glycidyl ether
b4: o-Phenyl phenol glycidyl ether
Component (c)
c1: 1,3-Dioxolane
c2: Ethylene oxide
Compound (B)
B1: 2-[2-Hydroxy-3,5-bis-(α,α-dimethylbenzyl) phenyl] benzotriazole
B2: 2-Hydroxy-4-oxybenzyl benzophenone
Component (C)
C1: Bis(2,2,6,6-tetramethyl-4-piperidyl) sebacate
C2: Dimethyl succinate-1-(2-hydroxyethyl)-4-hydroxy-2,2,6,6-tetramethyl piperidine polycondensate

What is claimed is:
1. A branched polyacetal resin composition, comprising:
(A) 100 parts by weight of a branched polyacetal copolymer which is the copolymeriziation reaction product of:
 (a) 100 parts by weight of trioxane,
 (b) 0.001 to 10 parts by weight of a monofunctional glycidyl compound, and
 (c) 0.1 to 20 parts by weight of a cyclic ether compound which is copolymerizable with trioxane, wherein said branched polyacetal copolymer has an oxymethylene group as the main repeating unit and a branching unit represented by the following formula (I):

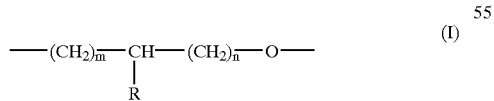

wherein m and n each is an integer of 0 to 5; the sum of m+n is 1 to 5; and R is a monovalent organic group having a molecular weight of 40 to 1000;
(B) 0.01 to 5 parts by weight of a weather (light) resistant stabilizer; and
(C) 0.01 to 5 parts by weight of a hindered amine substance; and wherein the monofunctional glycidyl compound (b) is selected from the glycidyl ether compounds represented by the following formulae (II), (III) and (IV):

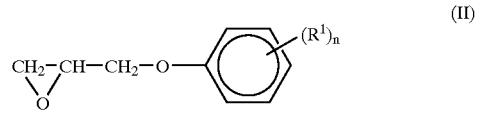

wherein $R^1$ is a $C_{1-12}$ alkyl group, a substituted alkyl group, an alkoxy group, an aryl group, a substituted aryl group or halogen; and n is an integer of 0 to 5 and, when n is 2 or more, the $R^1$s may be the same or different:

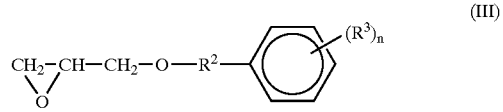

wherein $R^2$ is a $C_{1-30}$ alkylene group, a substituted alkylene group or a polyalkylene oxide glycol residue; $R^3$ is a $C_{1-12}$ alkyl group, a substituted alkyl group, an alkoxy group, an aryl group, a substituted aryl group or halogen; and n is an integer of 0 to 5 and, when n is 2 or more, the $R^3$s may be the same or different:

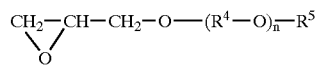

(IV)

wherein $R^4$ is a $C_{1-30}$ alkylene group; n is an integer of 0 to 20; and $R^5$ is a $C_{1-30}$ alkyl group, a $C_{2-20}$ alkenyl group or an alkynyl group.

2. The composition according to claim 1, wherein the monofunctional glycidyl compound (b) is a glycidyl ether compound having a molecular weight of 100 to 1000.

3. The composition according to claim 1 or 2, wherein the cyclic ether compound (c) which is copolymerizable with trioxane is at least one selected from the group consisting of ethylene oxide, 1,3-dioxolan, diethylene glycol formal and 1,4-butanediol formal.

4. The composition according to claim 3, wherein the weather (light) resistant stabilizer (B) is at least one compound selected from the group consisting of a benzotriazole substance, a benzophenone substance, an oxalic acid anilide substance, an aromatic benzoate substance and a cyanoacrylate substance.

5. The composition according to claim 1 or 2, wherein the weather (light) resistant stabilizer (B) is at least one compound selected from the group consisting of a benzotriazole substance, a benzophenone substance, an oxalic acid anilide substance, an aromatic benzoate substance and a cyanoacrylate substance.

* * * * *